(No Model.) 3 Sheets—Sheet 1.
M. P. HIGGINS & G. I. ALDEN.
TRUING MACHINE FOR EMERY WHEELS.
No. 566,908. Patented Sept. 1, 1896.
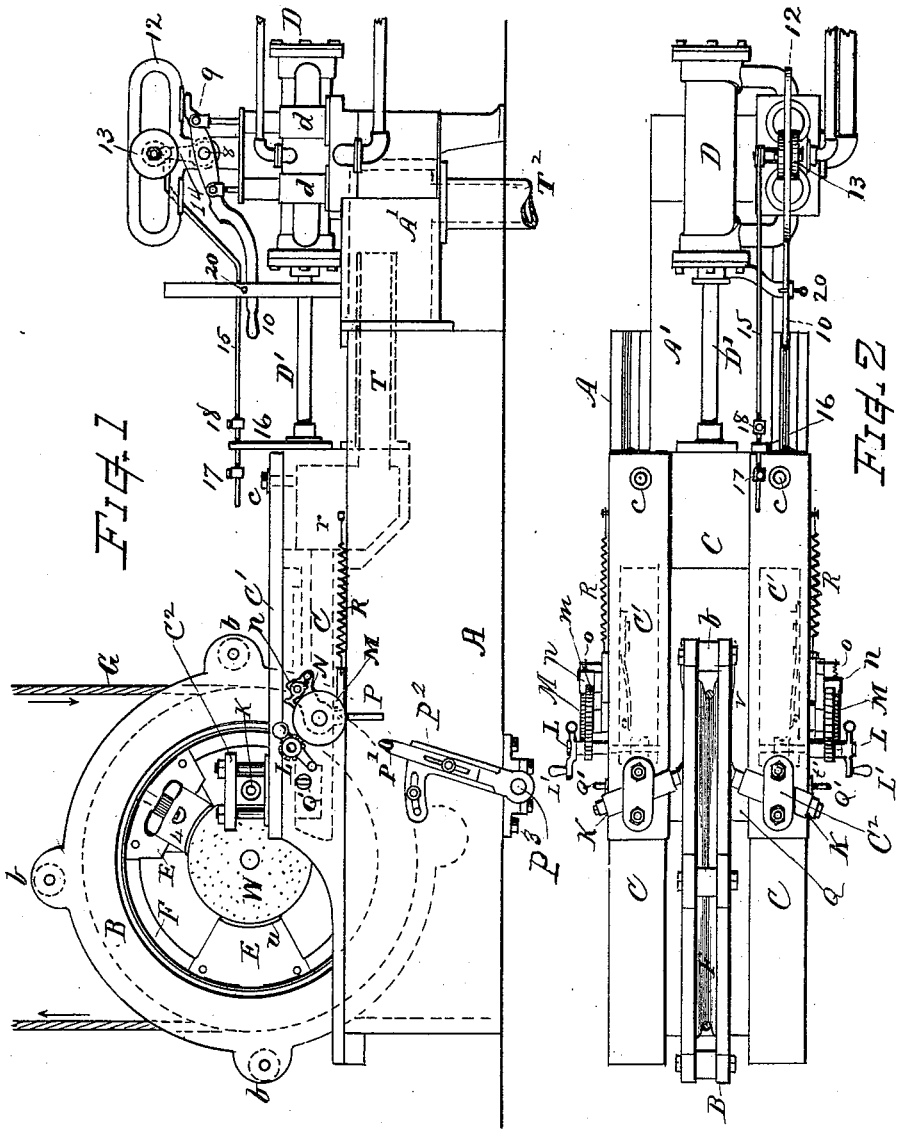
Witnesses.
Inventors
Milton P. Higgins
George I. Alden
By Chas. H. Burleigh
Attorney

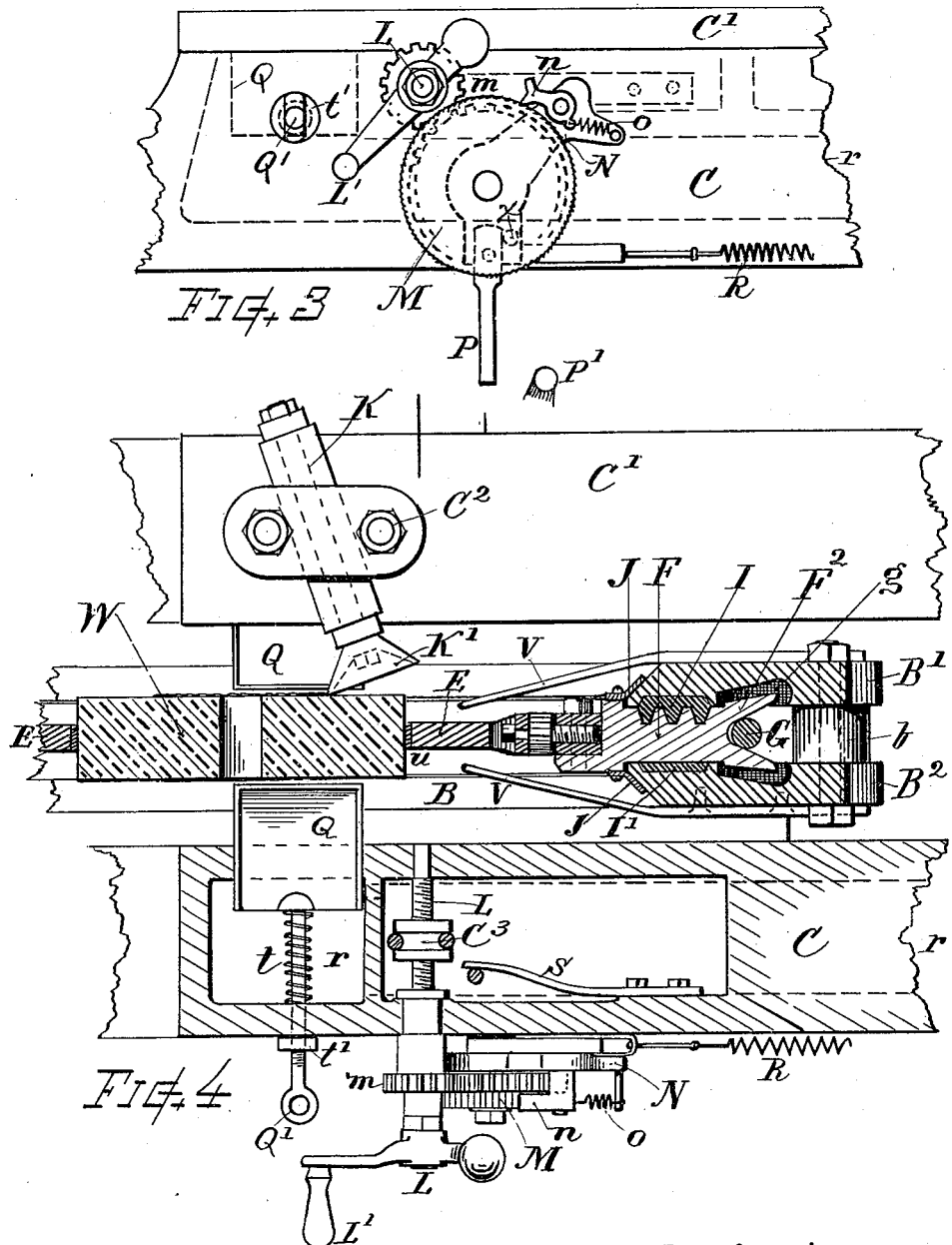

(No Model.) 3 Sheets—Sheet 3.

M. P. HIGGINS & G. I. ALDEN.
TRUING MACHINE FOR EMERY WHEELS.

No. 566,908. Patented Sept. 1, 1896.

Witnesses
J. R. Burton
Simeon E. King

Inventors
Milton P. Higgins
George I. Alden
By Chas. H. Burleigh
Attorney.

UNITED STATES PATENT OFFICE.

MILTON P. HIGGINS AND GEORGE I. ALDEN, OF WORCESTER, MASSACHUSETTS.

TRUING-MACHINE FOR EMERY-WHEELS.

SPECIFICATION forming part of Letters Patent No. 566,908, dated September 1, 1896.

Application filed March 10, 1896. Serial No. 582,678. (No model.)

*To all whom it may concern:*

Be it known that we, MILTON P. HIGGINS and GEORGE I. ALDEN, citizens of the United States, residing at Worcester, in the county of Worcester and State of Massachusetts, have invented a new and useful Truing-Machine for Emery-Wheels and other Disks, of which the following, together with the accompanying drawings, is a specification sufficiently full, clear, and exact to enable persons skilled in the art to which this invention appertains to make and use the same.

The prime object of the present invention is to provide an efficient machine for dressing and truing the flat sides of solid emery-wheels and similar disks to bring them to uniform or desired thickness and to render the sides parallel with each other.

Another object is to provide means for supporting and rotating an emery-wheel or other disk in a manner to permit the operation of dressing-tools over the entire disk-surface and upon both sides of the wheel or disk simultaneously.

Another object is to provide facilities for collecting or carrying away the grit that comes off from the emery-wheels in the process of truing them.

Another object is the exclusion of grit from the bearing-surfaces of the disk-carrier and its support; also, to provide guiding and bearing surfaces that will render the action of the annular carrier within its supporter true-running and durable.

Another object is to provide a hydraulic operator for imparting reciprocatory movement to the tool-carriage and means for automatically controlling the valves thereof.

Another object is to provide means for feeding the dressing-off tools to the work and adapted for effecting feeding action automatically or by hand, as desired.

These objects we attain by mechanism constructed and organized for operation as illustrated and fully explained in the following detailed description, the particular combinations and features of invention claimed being hereinafter definitely specified.

Figure 5:
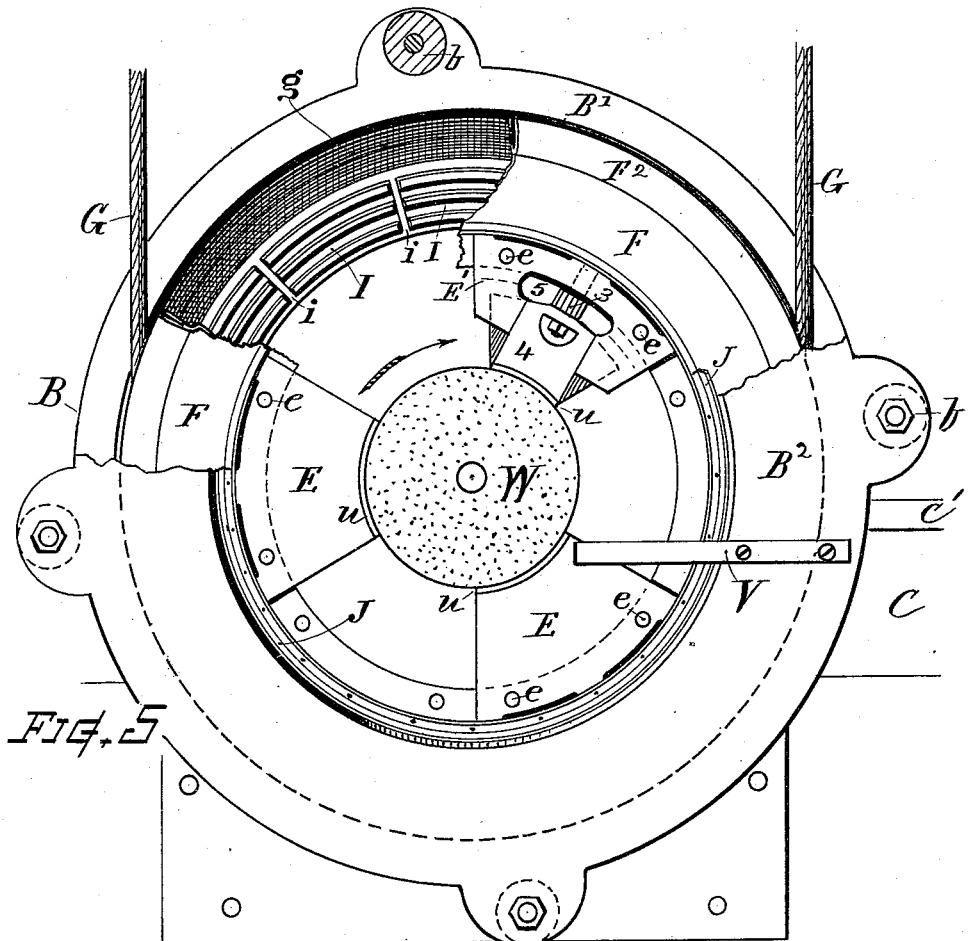
Figure 7:
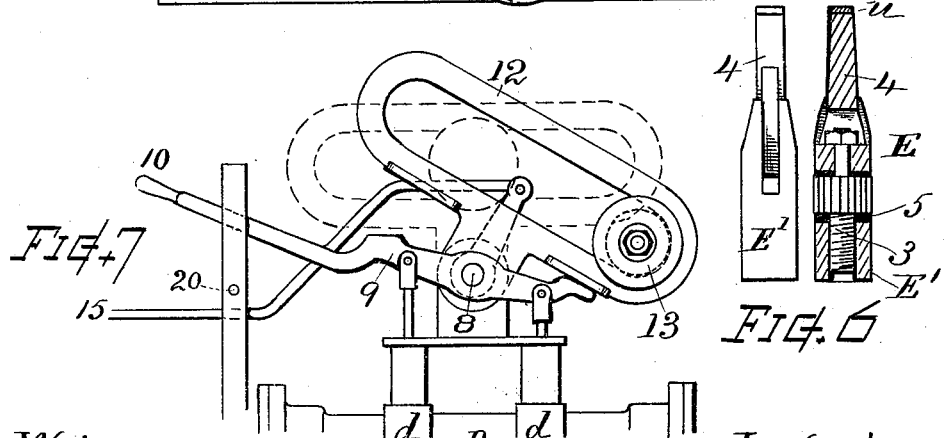
Figure 6:
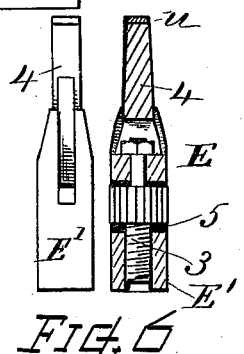

In the drawings, Figure 1 is a side view of a machine embodying our invention. Fig. 2 is a plan view of the same. Fig. 3 is a partial side view showing the feed-adjusting appliances. Fig. 4 is a part plan, part horizontal, sectional view showing details of the wheel-carrier, its supporter, the feeding appliances, dressing-off tool, and grit-collecting devices. Fig. 5 is a separate side view of the annular guiding and supporting frame, the rotatable wheel-carrier, and the disk-chucking devices, portions being shown broken away to reveal internal structure. Fig. 6 shows a side view and sectional view of the adjustable chuck-plate, and Fig. 7 is a side view illustrating the automatic valve-actuating devices.

Referring to parts, A denotes the stationary bed-frame, having longitudinal guide-ways thereon.

B indicates an annular guiding and supporting frame fixed in upright position between said guideways; C, a sliding table or carriage of bifurcated form mounted for reciprocative movement upon the guideways of the bed, with its respective limbs at either side of the upright guide-frames B, and D indicates means for imparting to the carriage C its backward and forward reciprocative movements. Such means in the present instance, and preferably, comprises a hydraulic cylinder and piston controlled as hereinafter explained. The annular frame or guide B has mounted therein a revoluble annulus or ring-shaped wheel-carrier F, provided with removable chucking jaws or plates E for the retention within it of the emery wheel or disk W, so as to expose the full disk-surfaces at both sides and without a center support. Said carrier is fitted with a grooved periphery F, in which runs the driving belt or rope G, by which rotary movement and power are imparted thereto from any suitable source, as indicated in Figs. 1 and 5. The guide-frame B is formed of two portions B' B², which are disposed parallel to each other at a short distance apart and bolted together with separating-pieces between them, as at *b*, their inner faces being chambered and babbitted, as at I I', to afford bearing and guide surfaces for the wheel-carrier ring F, and also grooved, as at *g*, to give space for the peripheral rim of the carrier. One side of the carrier is formed with a plain bearing-surface, while its opposite side is fitted with a series of annular grooves, into which the babbitt I matches in ribs or fillets that fill the grooves and serves as guides for maintaining the carrier-ring in proper concentric relation as it revolves within its supporter. The babbitt forms a fixed part on the frame B, and is preferably formed in a series of short sections, as illustrated in Fig. 5, the frame having solid radial partitions $i$ at intervals of its circle, which assist in keeping the babbitt firm in position.

To prevent grit from entering between the bearing-surfaces, guard-strips J, of leather or similar material, are attached to the carrier-ring and project against the inner beveled edge of the annular frame, covering the bearing-joint and serving to deflect and sweep off the grit when the mechanism is in operation.

The chuck devices consist of segment-plates E, secured by bolts or screws $e$ to an inwardly-projecting flange formed on the carrier-ring F. Their outer edge seats against said ring and their inner edge, which is preferably faced with leather $u$, rests against the peripheral surface of the emery-wheel W, as indicated in Figs. 5 and 6. One or more of said segments is made adjustable or provided with a slotted body-segment E', a radially-movable jaw 4, and a screw 3, whereby its jaw or movable part 4 can be forced against the wheel W for giving firm hold thereon. The head of the screw 3 is arranged in an opening 5 in the plate, where it can be readily turned by a suitable wrench or other instrument adapted therefor.

The chuck-segments E are removable and interchangeable with others of different proportions for accommodating disks or emery-wheels of various diameters. The edges of different sets of segments may be made of various thicknesses for thicker or thinner emery-wheels, the segments used being thinner than the wheels to be trued.

The carriage C is provided with laterally-movable top plates C', disposed longitudinally, one at each side of the machine, pivoted to the carriage at $c$ and having thereon, near their fore ends, clamp devices or bolts $C^2$ for retaining the bearings or holders K, that support the dressing-tools K', said holders being adjustable endwise and to different degrees of angularity relatively to the plane of the wheel-carrier.

Feed-screws L are arranged in the sides of the carriage for adjusting the respective top plates and tool-holding devices toward and from the plane of the carrier. The screw L connects with top plate C' by a nut $C^3$. When desired, a spring S is arranged within the chamber of the carriage that presses against a pin fixed in plate C' and acts to normally force the top plate outward for taking up any backlash on the feed-screws. The screws L are each provided with a hand-crank L', and are also connected by suitable gears $m$ with a ratchet-wheel M, mounted on a stud on the side of the carriage, (see Figs. 3 and 4,) and engaged by a pawl $n$, pivoted on a swinging arm or plate N, to which is pivoted a pendant P, that engages with a stop device P' as the carriage reciprocates. The pawl is normally pressed into engagement with the ratchet-wheel by a spring $o$. The pendant P is arranged to swing free in one direction, but to contact with a lug $x$ on the plate N and effect movement of said plate and pawl $n$ when swung in the other direction. A feed-spring R is connected with the pawl-carrying parts to return the same to normal position after their actuation by the pendant P. The operation and effect of this mechanism are that when the carriage moves back the pendant P, by engaging with the stop-arm P', swings back the pawl P for taking a new notch on the ratchet, and also strains the spring R. Then when the pendant has passed the stop the force of the spring R instantly acts to turn forward the plate N and ratchet-wheel M, thereby automatically turning the feed-screw L and giving movement of the plate C' and tool-holder K to advance the tool for taking a deeper cut.

The stop P' is best carried by a swinging arm $P^2$, having means for its fixed adjustment at desired positions in relation to the bed, (see Fig. 1,) so that the pendant P will engage and release in a manner to effect automatic feed of the tool at any required instant in the carriage movement. The arms $P^2$, at opposite sides of the machine, are preferably rigidly connected together by a shaft $P^3$, so that adjustment of one effects adjustment of both in the same relations.

Internally the carriage is formed hollow or inclosed, (see dotted lines, Fig. 1,) the chamber $r$ terminating in a tubular extension T, that telescopes with a dust-box A', fixed on the end of the bed A and from which a conductor $T^2$ leads to a suitable suction-blower (not shown) for creating an air-current through the chamber $r$.

Beneath the tool-holders K the chamber $r$ opens through the inner wall of the carriage at each side of the upright frame, and an adjustable grit deflector or drawer Q is disposed in the aperture for receiving the grit and dust thrown from the work by the dressing-tools and directing such grit into the chamber $r$, where it is carried off through the tubular extension and conductor $T^2$. The deflector Q, which is open at its rear side, is attached to a rod Q', that projects through the outer wall of the carriage, and said rod has thereon a spring $t$ at the interior for normally pressing the deflector toward the work, and an adjustable stop $t'$ for limiting the inward movement thereof, as may be desired, for giving the deflector close proximity to the wheel-surface without contact therewith. Guide-fingers V are fixed to the frame B for retracting the deflectors for avoiding contact thereof with said frame as the carriage is run back.

The dressing-tool consists of a conoidal cup-shaped steel head K', attached to a spindle that is supported to rotate free within the holder K, the end of the tool being presented to the work oblique to the plane of the surface operated upon, as indicated in Fig. 2. Other forms of dressing-off tools can, if desired, be employed in connection with holders and reciprocating carriage, as herein described, as may be best suited to the particular nature and constituents of the wheel or disk to be trued or operated upon. A piston in the hydraulic cylinder D is joined to the carriage C by the rod D' for imparting reciprocative motion to said carriage, and the hydraulic apparatus is provided with endwise-shifting valves of well-known kind, such as have heretofore been employed in hydraulic elevators, said valves being arranged in the upright cylinders $d$ and their rods 7, jointed to a working lever 9, fulcrumed at 8 and having its end extended in the handle 10. Above said lever there is a tilting frame or loop 12, pivoted at 8 and adapted to tilt down right or left and strike the lever 9 at either end. (See Fig. 7.) A free shifting weight or ball 13 is confined in the loop, but free to roll therein. An arm 14, in connection with the loop 12 or its axial shaft 8, has a rod 15 extending therefrom to a guide or lug 16, fixed to the carriage. Stop-collars 17 and 18 are adjustably fixed to the rod at either side of the lug. When the carriage is moved so that the lug strikes one of the collars, the rod is moved sufficiently to slightly tilt the loop 12, causing the weight 13 to shift and thus bring the loop forcibly down upon the valve-lever for operating the valves, thereby changing the direction of movement of the piston-rod D' and carriage C, connected therewith. For stopping the carriage movement the handle 10 of lever 9 is brought to a central position, as in Fig. 1, and retained by a pin 20, inserted through the upright guide-bar, or in other convenient manner.

In the operation the emery wheel or disk W is held in the annular carrier F by the chuck-plates E and rapidly rotated by revolution of the carrier-ring within the guides or supporter B. The dressing-off tools K' are respectively fed up to the opposite sides of the disk by the lateral movement of the top plates C', effected by the screws L and connected mechanism, and the tools are then simultaneously moved across the sides of the disk, parallel with the plane of its rotation, by the reciprocatory movement of the carriage C, the engaging edge of the tools rolling against the sides of the emery-wheel, forcing therefrom granules of material and truing the surfaces in a very rapid and accurate manner.

We claim as our invention and desire to secure by Letters Patent—

1. In a machine for truing disk-surfaces, the combination, of an upright carrier guide or supporter, an annular carrier revolubly mounted therein, and having means for holding within it an emery-wheel or other disk with both side faces of the same exposed, a reciprocating carriage provided with tool-holding appliances at both sides of the machine, said carriage movable on guides parallel with the plane of the disk-carrier; and dressing-tools mounted thereon for simultaneously dressing off the opposite faces of the disk.

2. In a surface-truing machine, an annular revoluble carrier consisting of an open-centered ring provided with means for supporting an emery wheel or other disk within its circle, with both sides of the disk exposed, a circumferential guide supporting said carrier and means for revolving said carrier, for the purpose set forth.

3. In a machine for truing emery-wheels or other disks, the wheel-carrier consisting of an open-centered ring mounted to revolve within an annular supporting and guiding frame, the circumference of said carrier fitted for peripherally receiving the driving power, said carrier-ring internally provided with inwardly-projecting segments adapted for embracing and supporting an emery-wheel or disk by the peripheral edge thereof with both of its side faces exposed, substantially as set forth.

4. In a machine for truing surfaces on emery wheels or disks, a wheel-carrier ring peripherally grooved for its driving-belt, and having surfaces, one or both, fitted with a series of annular grooves; in combination with an annular supporter therefor having adjacent bearing-surfaces that match the bearing-surfaces of said carrier-ring, with projecting ribs of babbitt which, in conjunction with the grooves, form guides for the annular movement of said ring; and a series of chuck-plates or wheel-holding devices arranged within said carrier-ring, for the purposes set forth.

5. In a machine for truing emery-wheels, in combination with the annular carrier-guiding frames, and the revoluble annular wheel-carrier having guide-grooves therein; the babbitt bearing-faces formed in short sections, ribbed to match said guide-grooves, and fixed in said supporting-frame, with narrow radial partitions between the ends of adjacent babbitt sections, as set forth.

6. In a machine for truing disk-surfaces, in combination with an annular or ring-shaped carrier having an inwardly-faced seating-surface and flange about the interior opening therethrough; the chucking-plate composed of the slotted segment E outwardly fitting against said seating-surface, the radially-movable jaw 4 mounted in guides on said segment, the inner end of said jaw adapted to press against the periphery of a disk, the jaw-adjusting screw 3 disposed for connecting and adjusting said jaw, and means for detachably securing said segment in the carrier-ring, substantially as set forth.

7. In a machine for truing emery-wheels or other disks, the combination, of the annular carrier, an upright supporting-guide for said annular carrier, chuck-plates within said carrier adapted for embracing the peripheral edge of the emery wheel or disk for holding the same with both side faces exposed, the longitudinally-reciprocating tool-carriage provided with opposite laterally-swinging top plates having tool-holder clamps thereon, the rotatable dressing-tools supported in holders that are adjustably confined by said clamps upon the respective top plates at opposite sides of the wheel-carrier and adapted for simultaneous action upon the opposite side faces of the disk, the feed-screws arranged at the sides of the carriage, and means substantially as described for automatically advancing or feeding both of the tool-supporting devices simultaneously toward the central plane of the carrier, for the purpose set forth.

8. In combination, the bed-frame having longitudinal guideways, the upright carrier-guiding frame or supporter, the wheel-carrier ring revolubly mounted in said supporter, its interior provided with chucking appliances for peripherally holding an emery wheel or disk, the reciprocating carriage having forwardly-extending limbs at either side of said supporter, the opposite laterally-movable top plates on said limbs, the tool-holders and dressing-tools mounted on said top plates, the feed-screws for adjusting said plates, means for automatically operating said adjusting-screws, and the hydraulic mechanism connected for moving said carriage.

9. In combination, with the reciprocating carriage having the laterally-adjustable top plate supporting the tool-holder and dressing-tool; the feed-screw mounted in the carriage-frame and engaging a nut connected with said top plate, the ratchet-wheel mounted upon a stud on the side of the carriage and connected by gears with said screw, the swing-plate or lever carrying a pawl that engages said ratchet-wheel, the pendant-bar pivoted to said swing-plate, the adjustable stop that engages said pendant, and the feed-spring connected with said swing-plate and with the carriage-frame, for the purposes set forth.

10. In a machine for truing disk-surfaces, the combination, of the revoluble disk-carrier, the reciprocating tool-carriage having the dressing tool or tools mounted thereon, the hydraulic appliances for moving said tool-carriage, the valves for controlling said hydraulic appliances, the tilting frame and self-shifting weight centrally-pivoted valve-lever, the tilting frame and self-shifting weight overlying said lever, a trip-rod connected for rocking said tilting frame and having stops thereon, and means connected with said tool-carriage for actuating said trip-rod by the carriage movement, all substantially as and for the purpose set forth.

11. In a machine for truing emery-wheels or similar disks, the combination, as described, of the grit-deflectors, the reciprocating internally-chambered tool-supporting carriage provided with the telescoping extension thereto, the stationary dust-box and conductor, for the purpose set forth.

12. The combination, with the annular wheel-carrier, the carrier-guide, the reciprocating carriage and dressing-tool; of the grit-deflector or drawer Q having a projecting guide-rod with a spring $t$ and an adjustable stop $t'$ thereon; and the guard-finger V attached to the carrier-guide frame, against which said grit-deflector is retracted when the carriage is moved back, substantially as set forth.

Witness our hands this 26th day of February, 1896.

MILTON P. HIGGINS.
GEORGE I. ALDEN.

Witnesses:
 CHAS. H. BURLEIGH,
 ELLA P. BLENUS.